US011902613B2

(12) United States Patent
Yu (10) Patent No.: US 11,902,613 B2
(45) Date of Patent: Feb. 13, 2024

(54) VIDEO TRANSPARENT PLAYING PROCESSING METHOD, INTELLIGENT TELEVISION, AND STORAGE MEDIUM

(71) Applicant: COOCAA NETWORK TECHNOLOGY CO., LTD., Guangdong (CN)

(72) Inventor: Zhan Yu, Shenzhen (CN)

(73) Assignee: COOCAA NETWORK TECHNOLOGY CO., LTD., Guangdong (CN)

( * ) Notice: Subject to any disclaimer, the term of this patent is extended or adjusted under 35 U.S.C. 154(b) by 101 days.

(21) Appl. No.: 17/598,480

(22) PCT Filed: Sep. 20, 2019

(86) PCT No.: PCT/CN2019/107040
§ 371 (c)(1),
(2) Date: Sep. 27, 2021

(87) PCT Pub. No.: WO2020/192048
PCT Pub. Date: Oct. 1, 2020

(65) Prior Publication Data
US 2022/0191580 A1    Jun. 16, 2022

(30) Foreign Application Priority Data
Mar. 28, 2019    (CN) .......................... 201910242349.9

(51) Int. Cl.
*H04N 21/431* (2011.01)
*G06F 3/0481* (2022.01)
*H04N 21/472* (2011.01)

(52) U.S. Cl.
CPC ....... *H04N 21/4312* (2013.01); *G06F 3/0481* (2013.01); *H04N 21/472* (2013.01)

(58) Field of Classification Search
CPC ............. H04N 21/4312; H04N 21/472; H04N 21/4854
See application file for complete search history.

(56) References Cited

U.S. PATENT DOCUMENTS

2016/0044294 A1    2/2016    Friedman
2018/0014087 A1    1/2018    Holyoak

FOREIGN PATENT DOCUMENTS

| CN | 103634654 A | 3/2014 |
| CN | 104038807 A | 9/2014 |

(Continued)

OTHER PUBLICATIONS

International Search Report dated Dec. 12, 2019 in corresponding International Application No. PCT/CN2019/107040; 6 pages.
(Continued)

*Primary Examiner* — Rong Le
(74) *Attorney, Agent, or Firm* — Maier & Maier, PLLC (57) ABSTRACT

A video transparent playing processing method, an intelligent television, and a storage medium, the method including: creating a video layer UI, processing image data; processing the image data to separate background colors and theme colors, modifying the background color to a transparent color value, and only keep the theme color; after data of each frame is processed, only the theme content is displayed when the video is played, and the original UI of the TV is displayed transparently through the background. The embodiments strip the video background and the video subject part when playing the video, and modifies the video background color to be transparent, while retaining the main part of the video, it is realized the effect that only the video theme is displayed, the background of the video becomes transparent, and the original UI of the TV is directly displayed.

14 Claims, 4 Drawing Sheets

(56) References Cited

FOREIGN PATENT DOCUMENTS

| CN | 104090753 | A | | 10/2014 | | |
|---|---|---|---|---|---|---|
| CN | 104954848 | A | | 9/2015 | | |
| CN | 105741228 | A | | 7/2016 | | |
| CN | 108182723 | A | | 6/2018 | | |
| CN | 108769806 | A | | 11/2018 | | |
| CN | 109410299 | A | * | 3/2019 | ............ | G06T 13/40 |
| CN | 109729417 | A | | 5/2019 | | |
| KR | 101577012 | B1 | * | 10/2014 | | |

OTHER PUBLICATIONS

Chinese Office Action dated May 17, 2019 in corresponding Application No. 201910242349.9; 6 pages.

* cited by examiner

VIDEO TRANSPARENT PLAYING PROCESSING METHOD, INTELLIGENT TELEVISION, AND STORAGE MEDIUM

CROSS-REFERENCES TO RELATED APPLICATIONS

This application is a national stage application of PCT Patent Application No. PCT/CN2019/107040, filed on Sep. 20, 2019, which claims priority to Chinese Patent Application No. 201910242349.9, filed on Mar. 28, 2019, the content of all of which is incorporated herein by reference.

FIELD

The present disclosure relates to the technical field of intelligent television, and, more particularly, to a video transparent playing processing method, an intelligent television, and a storage medium.

BACKGROUND

In video playback software, a user interface (UI) is an important part of it, with the popularization of Android® intelligent televisions (TVs), a plurality of traditional video playback functions may no longer meet more and more market needs (user needs), because traditional video playback may block the UI behind it in the TV, causing a background of a video to be opaque, so that an original UI effect of the TV may not be displayed through the background.

Therefore, the current technology needs to be improved and developed.

SUMMARY

The main purpose of the present disclosure is to provide a video transparent playing processing method, an intelligent television, and a storage medium, which aims to solve the problem that the original UI of the TV may not be transparently displayed during video playback in the prior art; by separating a video background and video theme part when a video is played, modifying the video background color to be transparent, and reserving the video theme part at the same time, the effects of only displaying the video theme, making the background of the video transparent, and directly displaying the original UI of the television through the video are realized.

In order to achieve the above purpose, the disclosure provides a video transparent playing processing method, wherein the method comprises the following steps:
  creating a Texture View instance of an open graphics library embedded in Android® as a video layer UI for playback;
  creating a renderer of the open graphics library, and setting the renderer as a renderer of the Texture View instance;
  monitoring a rendering of the renderer, preparing to call back setOnSurfacePreparelListener, and transferring a callback Surface layer to an Android® MediaPlayer;
  calling back a playback decoder data, and a UI frame enters a ready-to-draw callback state;
  processing the playback decoder data to obtain a color value of each pixel in the UI frame, and determining whether the color value of a pixel is a background color;
  processing an image data to separate the background color and a theme color, and modifying the background color to a transparent color value, only retaining the theme color;
  processing data of each frame, before displaying only a theme content when a video is played and displaying transparently an original UI of TV through background.

Further, the processing an image data to separate the background color and a theme color, and modifying the background color to a transparent color value, only retaining the theme color comprises:
  creating and monitoring frame data played by the Android® MediaPlayer, and
  setting a flag bit to indicate availability to be rendered after calling back, determining the flag bit in a frame drawing callback on Draw Frame of the renderer, then processing the background color and theme color, modifying the background color to the transparent color value, and only retaining the theme color.

Further, the modifying the background color to a transparent color value, and only retaining the theme color comprises:
  While creating a vertex shader and a fragment shader of the open graphics library, the vertex shader returns a coordinate value vTextureCoord, the fragment shader performs color processing of pixels, when a color is determined to belong to the background color, changing a pixel corresponding to the color to a transparent color, otherwise the pixel belongs to the theme color, and retains an original color value.

Further, the processing data of each frame, before displaying only a theme content when a video is played, and displaying transparently original UI of TV through background comprises:
  controlling whether the rendering needs to be stopped through the MediaPlayer and a life cycle of layer;
  processing data of each frame, before displaying only the theme content when a video is played and displaying transparently an original UI of TV through background.

Further, the processing the playback decoder date to obtain a color value of each pixel in the UI frame, and determining whether the color value of a pixel is a background color comprises:
  modifying a pixel value to be transparent when the pixel color value is determined to be the background color;
  keeping a pixel color value unchanged when the pixel color value is determined to be not the background color.

Further, after the modifying a pixel value to be transparent when the pixel color value is determined to be the background color, keeping a pixel color value unchanged when the pixel color value is determined to be not the background color comprises:
  starting drawing and playing a current frame image after a pixel color value determination processing is completed.

Further, after the starting drawing and playing the current frame image after a pixel color value determination processing is completed further comprises:
  determining whether an entire video has finished playing, if yes, ending a current process.

Further, after the starting drawing and playing the current frame image after a pixel color value determination processing is completed further comprises:
  determining whether an entire video has finished playing, if no, playing and decoding a next frame, and returning to continue executing the UI frame and entering a ready-to-draw callback state until the entire video has finished playing.

Further, while creating a vertex shader and a fragment shader, the vertex shader returns a coordinate value vTextureCoord, the fragment shader performs color processing of the pixel, when a color is determined to belong to the background color, changing a pixel corresponding to the color to a transparent color, otherwise the pixel belongs to the theme color, and retains the original color value comprises:

inputting the frame data, before converting the coordinate through the vertex shader;

obtaining a pixel through the fragment shader, comparing the pixel with the background color, and determining whether the colors are the same;

when the colors are the same, modifying a pixel value of the background color to be transparent, and drawing after the frame data processing is completed;

when the colors are not the same, determining the pixel to belong to the theme color, and retaining the original color value.

The vertex shader is a set of instruction codes, which are executed when rendering a plurality of vertices.

Only one of the vertex shaders is activated at a time.

Further, an input of the fragment shader is obtained by an interpolation of an output data from the vertex shader.

The step of separating the background color and the theme color is achieved through ChromaKey.

In addition, in order to achieve the above purpose, the present disclosure provides an intelligent TV, which includes a memory, a processor, and a video transparent playback processing program stored in the memory and capable of running on the processor, the processor implements a plurality of steps of the video transparent playback processing method as mentioned above when executing the video transparent playback processing program.

Furthermore, in order to achieve the above purpose, the present disclosure further provides a non-transitory storage medium, wherein having a video transparent playback processing program stored, and the processor implements a plurality of steps of the video transparent playback processing method as mentioned above when executing the video transparent playback processing program.

The present disclosure discloses a video transparent playing processing method, an image data is processed by creating a video layer UI; the image data is processed to separate a background color and a theme color, the background color is modified to a transparent color value, and only the theme color is retained; after processing data of each frame, only a theme content is displayed when the video is played, and an original UI of a TV is displayed through a transparent background, it is realized an effect that only the video theme is displayed, the background of the video becomes transparent, and the original UI of the TV is directly displayed.

DETAILED DESCRIPTION OF THE EMBODIMENTS

In order to make the purpose, technical solution, and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Embodiment 1

Figure 1:
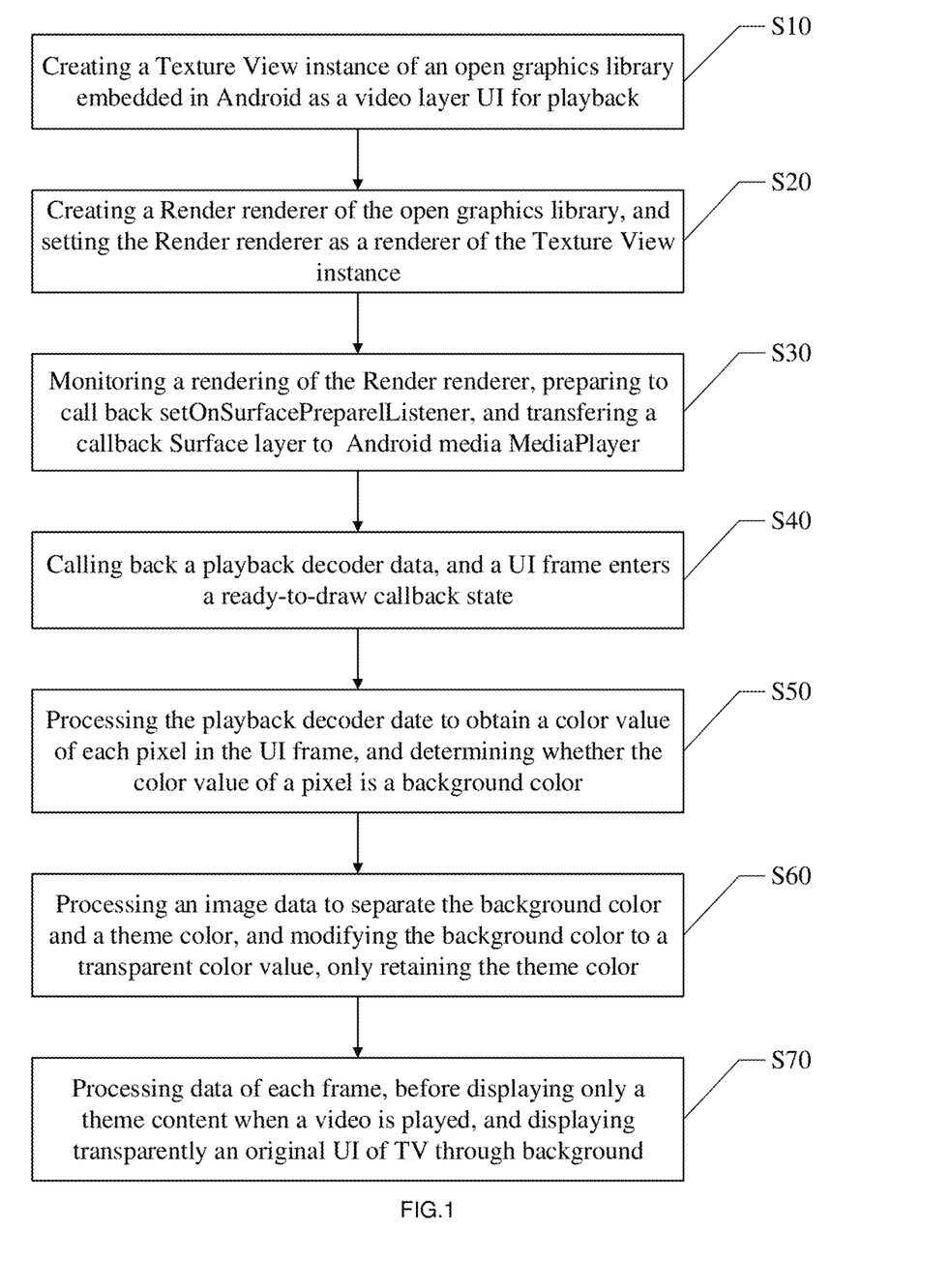
FIG. 1 illustrates a flowchart of an embodiment of the video transparent playing processing method in the present disclosure.

A video transparent playing processing method according to an embodiment of the present disclosure, as shown in FIG. 1, the method comprises the following steps:

step S10, creating a Texture View instance of an open graphics library embedded in Android® as a video layer UI for playback;

step S20, creating a renderer of the open graphics library, and setting the renderer as a renderer of the Texture View instance;

step S30, monitoring a rendering of the renderer, preparing to call back setOnSurfacePrepareIListener, and transferring a callback Surface layer to an Android® MediaPlayer;

step S40, calling back a playback decoder data, and a UI frame enters a ready-to-draw callback state;

step S50, processing the playback decoder date to obtain a color value of each pixel in the UI frame, and determining whether the color value of a pixel is a background color;

step S60, processing an image data to separate the background color and a theme color, and modifying the background color to a transparent color value, only retaining the theme color;

step S70, processing data of each frame, before displaying only a theme content when a video is played and displaying transparently an original UI of TV through background.

Specifically, creating an Android® embedded OpenGL® (a cross-language, cross-platform application programming interface for rendering 2D and 3D vector graphics) TextureView (TextureView is very simple to use, only thing to do is to obtain the SurfaceTexture for rendering content, a specific method is to create the TextureView object firstly, and then implement the SurfaceTextureListener interface) instance as the video layer UI for playback;

create an OpenGL® renderer and set the renderer as a renderer of the Texture View instance; create the renderer of the open graphics library, and setting the renderer as a renderer of the Texture View instance; monitor a rendering of the renderer, prepare to call back setOnSurfacePreparelListener, and transfer a callback Surface layer to an Android® MediaPlayer.

Figure 2:
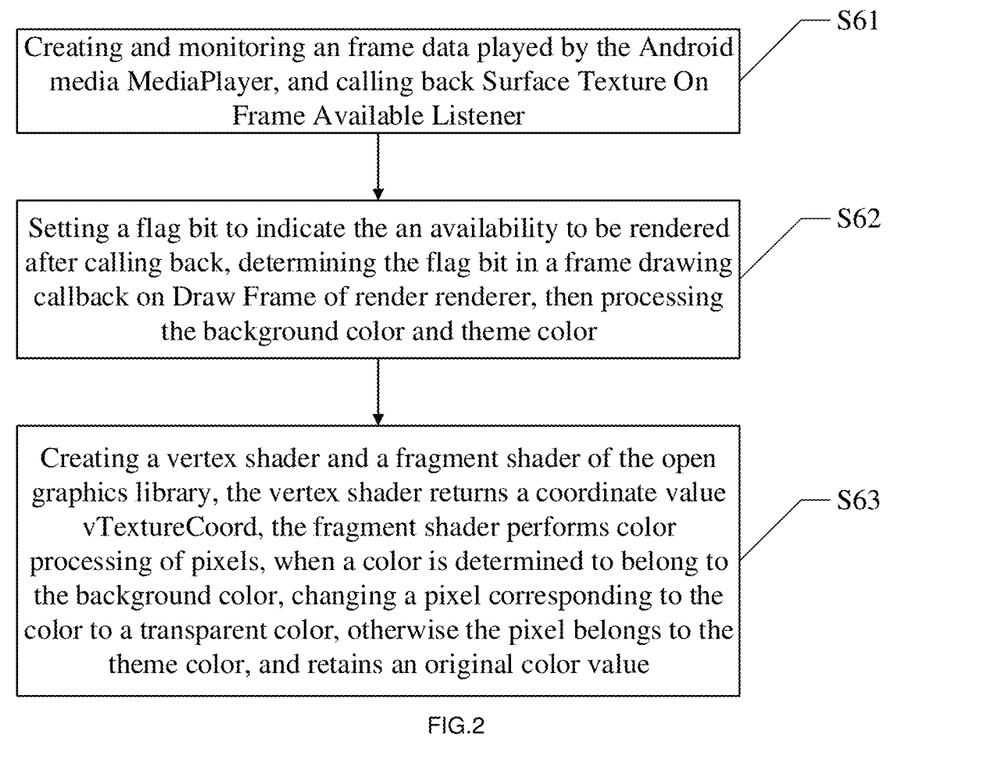
FIG. 2 illustrates a flowchart of step S60 in an embodiment of the video transparent playing processing method in the present disclosure.

Further, please refer to FIG. 2, which is a flowchart of step S60 in the video transparent playing processing method provided by the present disclosure.

As shown in FIG. 2, the step S60 comprises:

step S61, creating and monitoring frame data played by the Android® MediaPlayer, and calling back Surface Texture On Frame Available Listener;

step S62, setting a flag bit to indicate availability to be rendered after calling back, determining the flag bit in a frame drawing callback on Draw Frame of the renderer, then processing the background color and theme color;

step S63, creating a vertex shader and a fragment shader of the open graphics library, wherein the vertex shader returns a coordinate value vTextureCoord, the fragment shader performs color processing of pixels, when a color is determined to belong to the background color, changing a pixel corresponding to the color to a transparent color, otherwise the pixel belongs to the theme color, and retains an original color value.

Specifically, create a monitoring MediaPlayer, play frame data, and call back Surface Texture. On Frame Available Listener; after a callback, set a flag bit to indicate the frame date is renderable, after determining the flag bit in the frame drawing callback on Draw Frame of the renderer, process the background color and theme color; create a OpenGL® vertex shader (vertex shader is a set of instruction codes, which are executed when the vertices are rendered, only one vertex shader may be activated at a same time) and a fragment shader (a very important programmable shader stage, also known as pixel shader, an input of fragment shader is a result of vertex information interpolation in previous stage, specifically, it is obtained by interpolation according to data output from the vertex shader, and its output is one or more color values) of the open graphics library, the vertex shader returns to a coordinate value vTextureCoord, the fragment shader performs color processing of pixel, when it is determined that a color belongs to the background color, it changes the pixel corresponding to the color to transparent color, otherwise the pixel belongs to the theme color, and it retains the original color value.

Further, a step before image data processing further comprises: calling back a playback decoder data, and a UI frame enters a ready-to-draw callback state; processing the playback decoder date to obtain a color value of each pixel in the UI frame, and determining whether the color value of pixel is background color.

Specifically, modifying a pixel value to be transparent when it is determined that a pixel color value is the background color; keeping the pixel color value unchanged when it is determined that the pixel color value is not the background color; starting drawing and playing a current frame image when a pixel color value processing is completed.

Further, the step S23 specifically comprises: after inputting the frame data, converting coordinate through the vertex shader; obtaining the pixel through the fragment shader, comparing the pixel with the background color, and determining whether the color is consistent; when the colors are the same, modifying the background color pixel to be transparent, and drawing after the frame data processing is completed; when the colors are inconsistent, determining the pixel to belong to the theme color, and retaining the original color value.

Figure 3:
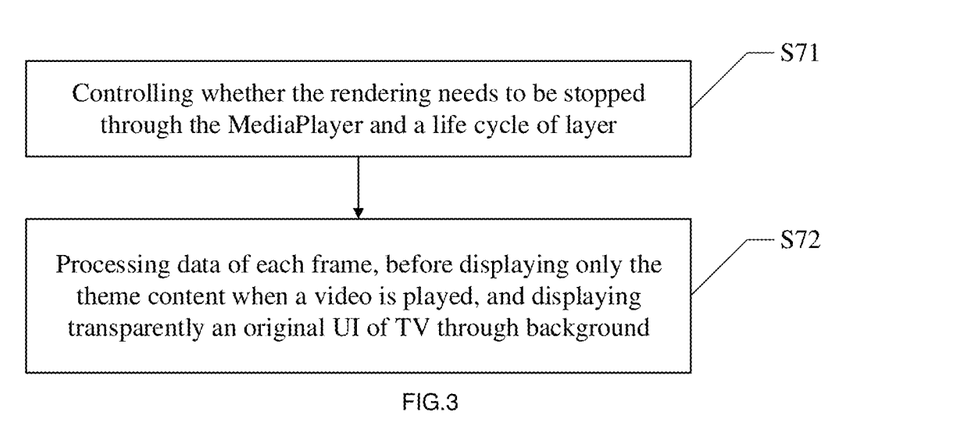
FIG. 3 illustrates a flowchart of step S70 in an embodiment of the video transparent playing processing method in the present disclosure.

Further, refer to FIG. 3, which is a flowchart of step S70 in the video transparent playing processing method provided by the present disclosure.

As shown in FIG. 3, the step S70 comprises:

step S71, controlling whether the rendering needs to be stopped through the MediaPlayer and a life cycle of layer;

step S72, processing data of each frame, before displaying only the theme content when a video is played and displaying transparently an original UI of TV through background.

Further, determining whether entire video has finished played, if yes, ending current process, if no, playing and decoding a next frame, and returning to continue executing the UI frame and entering the ready-to-draw callback state until the entire video has finished played.

Android® video playback architecture separates the video decoding and playback from the video layer UI display, decoded data of each frame is transmitted to the video layer UI for drawing and display, taking advantage of this technical architecture, its own video layer UI is created, processing the data before drawing the video layer UI.

Using the technical framework of Android® video playback, its own video layer UI maybe created, when the video decoded data is transmitted to the video layer UI for playback, the data is processed, because the data is the data of each frame, one frame is equivalent to an image, separating the background color and the theme color, modifying the background color to a transparent color value, and retaining only the theme color, so that by continuously processing data of each frame, only displaying the theme content during playback is realized, and the original UI of the TV is displayed with a transparent background.

The main way to separate the background color is through ChromaKey technology (using the ChromaKey filter for matting, a basic principle is to turn a color within a specified range of values into transparent or semi-transparent), it is also a technology of using mask or matting based on the color of the image, this technology may easily realize separation of an image subject from the background color. ChromaKey technology needs to maintain the color difference between the background and the subject when creating a video or image, for example, the background color is all green, and the theme color is for people wearing red clothes, as people may have yellow skin and black hair, both of which are quite different from the background color, they may be distinguished.

Figure 4:
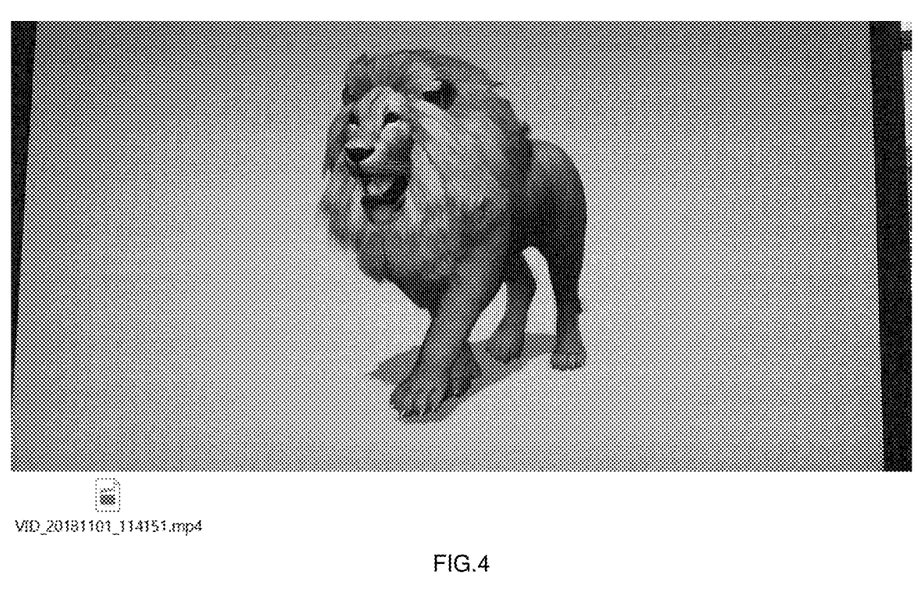
FIG. 4 illustrates a schematic diagram of the original video playback effect without transparent processing in an embodiment of the video transparent playing processing method in the present disclosure.
Figure 5:
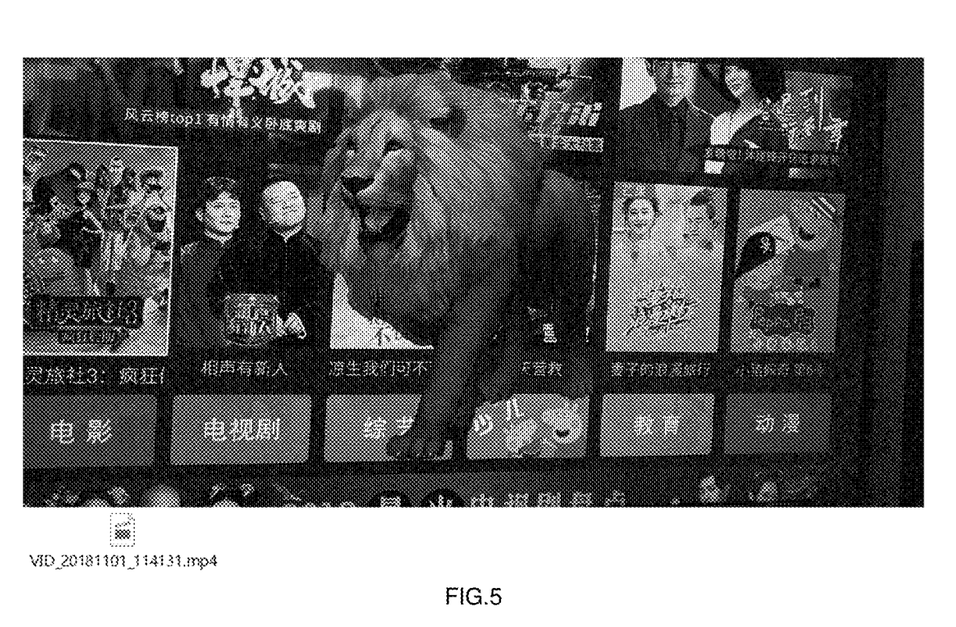
FIG. 5 illustrates a schematic diagram of the original video playback effect after transparent processing in an embodiment of the video transparent playing processing method in the present disclosure.

As shown in FIG. 4, it is the original video playback effect without transparency processing (the background color is green), in FIG. 4, there is a video file in lower part, so the original UI effect of interface could not be seen, after the above-mentioned processing, as shown in FIG. 5, for the video playback effect after transparent processing, then UI behind could be seen, (similarly, there is a video file at the bottom of FIG. 5); a key point of the present disclosure is to create its own video layer UI canvas through the Android® video player framework, when the video is played, processing the pixel data firstly rather than drawing directly, changing the background color transparent, and playing the video after the processing is completed, so that an effect of playing a transparent video may be achieved.

Embodiment 2

Figure 6:
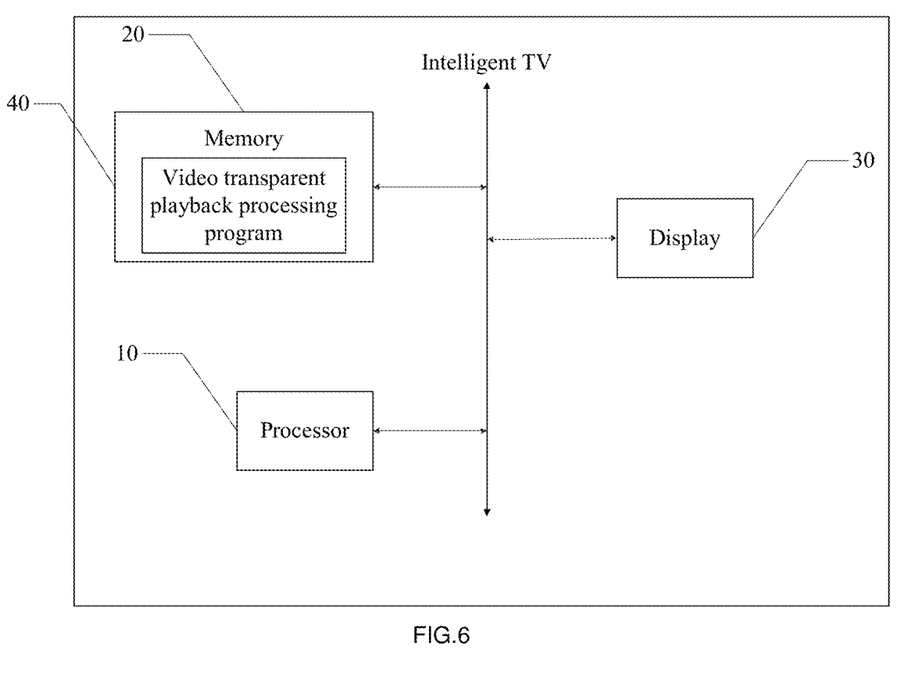
FIG. 6 is a schematic diagram of the operating environment of an embodiment of the intelligent TV in the present disclosure.

Further, as shown in FIG. 6, based on above-mentioned transparent video playback processing method, the present disclosure also provides an intelligent TV (of course not limited to intelligent TVs, it may include all Android® smart devices, such as Android® phones, Android® Pads, etc.), the intelligent TV includes a processor 10, a memory 20, and a display 30. FIG. 6 just shows part of the components of the intelligent TV, but it should be understood that it is not required to implement all the shown components, and more or fewer components may be implemented instead.

In some embodiments, the memory 20 may be an internal storage unit of the intelligent TV, such as a hard disk or memory of the intelligent TV. In other embodiments, the memory 20 may also be an external storage device of the intelligent TV, such as a plug-in hard disk, a smart memory card (SMC), a secure digital (SD) card, a flash card, etc., equipped on the intelligent TV. Further, the memory 20 may also include both an internal storage unit of the intelligent TV and an external storage device. The memory 20 is configured to store application software and various data installed on the intelligent TV, such as a program code of the intelligent TV installed. The memory 20 could also be used to temporarily store data that has been output or will be output. In one embodiment, a video transparent playback processing program 40 is stored in the memory the video transparent playback processing program 40 could be executed by the processor 10 to realize the video transparent playback processing method in this application.

In some embodiments, the processor 10 may be a central processing unit (CPU), a microprocessor or other data processing chip, which is used to run the program code or process data stored in the memory 20, for example to perform the transparent video playback processing method, etc.

In some embodiments, the display 30 may be an LED display, a liquid crystal display, a touch liquid crystal display, an organic light-emitting diode (OLED) touch device, etc. The display 30 is used for displaying information on the intelligent TV and for displaying a visualized user interface. The interiors 10-30 (processor 10, memory display 30) of the intelligent TV communicate with each other through a system bus.

In an embodiment, when the processor 10 executes the video transparent playback processing program 40 in the memory 20, the following steps are implemented:
creating a Texture View instance of an open graphics library embedded in Android® as a video layer UI for playback;
creating a renderer of the open graphics library, and setting the renderer as a renderer of the Texture View instance;
monitoring a rendering of the renderer, preparing to call back setOnSurfacePreparelListener and transferring a callback Surface layer to an Android® MediaPlayer;
calling back a playback decoder data, and a UI frame enters a ready-to-draw callback state;
processing the playback decoder date to obtain a color value of each pixel in the UI frame, and determining whether the color value of a pixel is a background color;
processing an image data to separate the background color and a theme color, and modifying the background color to a transparent color value, only retaining the theme color;
processing data of each frame, before displaying only a theme content when a video is played and displaying transparently an original UI of TV through the background.

The processing an image data to separate the background color and a theme color, and modifying the background color to a transparent color value, only retaining the theme color comprises:
creating and monitoring frame data played by the Android® MediaPlayer, and
setting a flag bit to indicate the availability to be rendered after calling back, determining the flag bit in a frame drawing callback on Draw Frame of the renderer, then processing the background color and theme color, modifying the background color to the transparent color value, and only retaining the theme color.

The modifying the background color to a transparent color value, and only retaining the theme color comprises:
creating a vertex shader and a fragment shader of the open graphics library, the vertex shader returns a coordinate value vTextureCoord, the fragment shader performs color processing of pixels, when a color is determined to belong to the background color, changing a pixel corresponding to the color to a transparent color, otherwise the pixel belongs to the theme color, and retains an original color value.

The processing data of each frame, before displaying only a theme content when a video is played, and displaying transparently original UI of TV through background comprises:
controlling whether the rendering needs to be stopped through the MediaPlayer and a life cycle of layer;
processing data of each frame, before displaying only the theme content when a video is played and displaying transparently an original UI of TV through background.

The playback decoder date to obtain a color value of each pixel in the UI frame, and determining whether the color value of a pixel is a background color comprises:
modifying a pixel value to be transparent when the pixel color value is determined to be the background color;
keeping a pixel color value unchanged when the pixel color value is determined to be not the background color.

The modifying a pixel value to be transparent when the pixel color value is determined to be the background color, keeping a pixel color value unchanged when the pixel color value is determined to be not the background color comprises:
starting drawing and playing a current frame image after a pixel color value determination processing is completed.

After the starting drawing and playing the current frame image after a pixel color value determination processing is completed further comprises:
determining whether an entire video has finished playing, if yes, ending a current process.

After the starting drawing and playing the current frame image after a pixel color value determination processing is completed further comprises:
determining whether an entire video has finished playing, if no, playing and decoding a next frame, and returning to continue executing the UI frame and entering a ready-to-draw callback state until the entire video has finished playing.

While creating a vertex shader and a fragment shader of the open graphics library, the vertex shader returns a coordinate value vTextureCoord, the fragment shader performs color processing of the pixel, when a color is determined to belong to the background color, changing a pixel corresponding to the color to a transparent color, otherwise the pixel belongs to the theme color, and retains the original color value comprises:
inputting the frame data, before converting the coordinate through the vertex shader;
obtaining a pixel through the fragment shader, comparing the pixel with the background color, and determining whether the colors are the same;
when the colors are the same, modifying a pixel value of the background color to be transparent, and drawing after the frame data processing is completed;
when the colors are not the same, determining the pixel to belong to the theme color, and retaining the original color value.

The vertex shader is a set of instruction codes, which are executed when rendering a plurality of vertices.

Only one of the vertex shaders is activated at a time.

An input of the fragment shader is obtained by an interpolation of an output data from the vertex shader.

The step of separating the background color and the theme color is through ChromaKey.

Embodiment 3

The disclosure further discloses a storage medium, wherein having a video transparent playback processing program stored, and the processor implements a plurality of steps of the video transparent playback processing method as mentioned above when executing the video transparent playback processing program.

In summary, the present disclosure provides a video transparent playing processing method, an intelligent television, and a storage medium, the method comprises: creating the video layer UI, processing image date before a video decoded data is transferred to a video layer UI; processing the image data to separate the background color and the theme color, and changing the background color to a transparent color value, and retaining only the theme color; after processing data of each frame, only a theme content is displayed when the video is played, and the original UI of the TV is displayed transparently through a background. The present disclosure strips off the video background and the video subject part when playing the video, and modifies the video background color to be transparent, while retaining the video subject part, realizes the effect that only the video subject is displayed, the video background becomes transparent, and the original TV is displayed directly through UI.

Of course, those of ordinary skill in the art can understand that all or part of the process of implementing the method of the above-mentioned embodiment of the terminal can be completed by instructing relevant hardware (such as a processor, a controller, etc.) through a computer program, and the program may be stored in a computer. In a readable storage medium, the program may include the processes of the foregoing method embodiments when executed. The storage medium mentioned may be a memory, a magnetic disk, an optical disk, and so on.

It should be understood that the application of the present disclosure is not limited to the above examples listed. A person having ordinary skill in the art can improve or change the applications according to the above descriptions, all of these improvements and transforms should belong to the scope of protection in the appended claims of the present disclosure.

What is claimed is:

1. A video transparent playing processing method, comprising:
creating a video layer user interface (UI) for playback;
creating a renderer;
setting the renderer as a renderer of the video layer UI;
monitoring a rendering of the renderer;
calling back a playback decoder data;
processing the playback decoder data to obtain a color value of each pixel in each frame on the video layer UI;
determining whether the color value of each pixel is a background color;
processing image data to separate the background color from a theme color, the processing image data step further comprising:
creating and monitoring frame data,
setting a flag bit to indicate availability to be rendered after calling back,
determining the flag bit in the renderer, then
processing the background color and the theme color, and
modifying the background color to a transparent color value and only retaining the theme color;
processing data of each frame, before displaying only the theme color when a video is played; and
displaying transparently an original UI.

2. The method according to claim 1, the modifying step further comprising:
creating a vertex shader and a fragment shader, wherein the vertex shader returns a coordinate value and the fragment shader performs color processing of pixels, when a color is determined to belong to the background color,
changing a pixel corresponding to the color to the transparent color value,
otherwise the pixel belongs to the theme color and retains an original color value.

3. The method according to claim 2, further comprising:
inputting the frame data before converting the coordinate through the vertex shader;
obtaining a pixel through the fragment shader;
comparing the pixel with the background color; and
determining whether the colors are the same;
when the colors are the same, modifying a pixel value of the background color to be transparent and rendering after the frame data processing is completed; and
when the colors are not the same, determining the pixel to belong to the theme color, and retaining the original color value.

4. The method according to claim 3, wherein there are a plurality of vertex shaders and only one of the vertex shaders is active at a given time.

5. The method according to claim 3, wherein an input of the fragment shader is obtained by an interpolation of output data from the vertex shader.

6. The method according to claim 1, further comprising, prior to the processing data step:
controlling whether the rendering needs to be stopped.

7. The method according to claim 1, the determining color value step further comprising:
modifying a pixel value to be transparent when the pixel color value is determined to be the background color; and
keeping a pixel color value unchanged when the pixel color value is determined to not be the background color.

8. The method according to claim 7, further comprising:
rendering a current frame image after a pixel color value determination processing is completed.

9. The method according to claim 8, further comprising:
determining whether an entire video has finished playing; and after the entire video has finished playing, ending a current process.

10. The method according to claim 9, further comprising:
determining whether an entire video has finished playing; and while the video is still playing, decoding a next frame, and continuing to execute the UI frame until the entire video has finished playing.

11. The method according to claim 10, wherein the vertex shader is a set of instruction codes which are executed when rendering a plurality of vertices.

12. The method according to claim 1, wherein separating the background color and the theme color is achieved through chroma key compositing.

13. A non-transitory storage medium, having a video transparent playback processing program stored, wherein a processor implements a plurality of steps of the video transparent playback processing method according to claim 1 when executing the video transparent playback processing program.

14. A television, comprising a memory, a processor, and a video transparent playback processing program stored in the memory and configured to run on the processor, wherein the processor implements a plurality of steps of the video transparent playback processing method according to claim 1 when executing the video transparent playback processing program.

* * * * *